March 5, 1929.   R. P. TOLEN ET AL   1,704,353
REAMER ATTACHMENT FOR DIE STOCKS
Filed Sept. 16, 1926   2 Sheets-Sheet 1
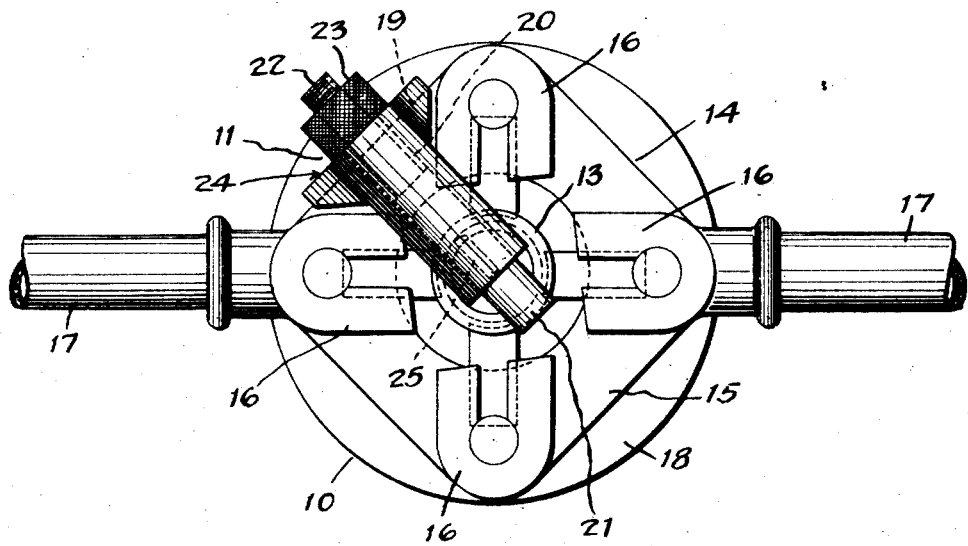
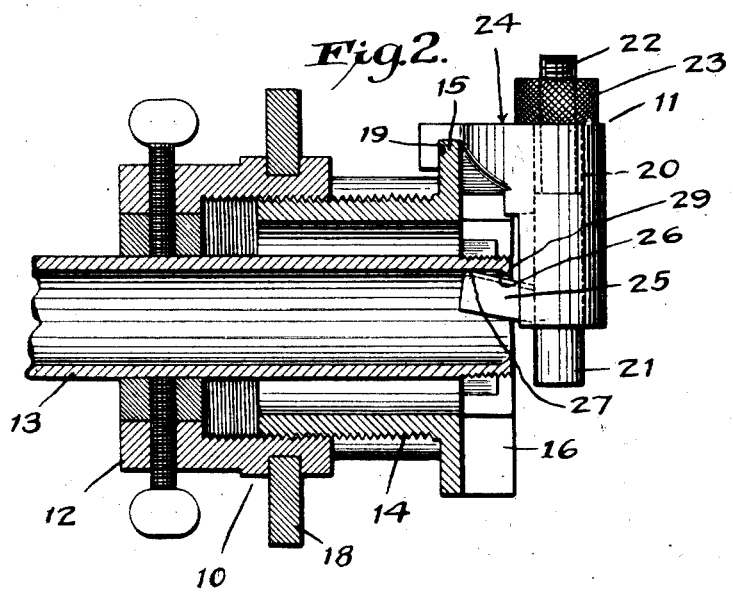
INVENTORS
Robert P. Tolen,
John J. Carpenter
BY
THEIR ATTORNEY March 5, 1929. R. P. TOLEN ET AL 1,704,353
REAMER ATTACHMENT FOR DIE STOCKS
Filed Sept. 16, 1926  2 Sheets-Sheet 2

INVENTORS
Robert P. Tolen
John J. Carpenter
BY
Geo. R. Senior
THEIR ATTORNEY

Patented Mar. 5, 1929.

1,704,353

UNITED STATES PATENT OFFICE.

ROBERT P. TOLEN, OF ARLINGTON, AND JOHN J. CARPENTER, OF KEARNY, NEW JERSEY.

REAMER ATTACHMENT FOR DIE STOCKS.

Application filed September 16, 1926. Serial No. 135,758.

This invention relates to a reaming attachment for die-stocks and has for its object to provide a means for removing the burr from the inner end of a pipe simultaneously with the backing off of the die-stock after the pipe has been threaded.

It is a well known fact that in cutting pipe with a disc cutter, which is the one most commonly used, a substantial flange or burr is left on the inside walls of the ends of the pipe. It is necessary to remove this burr as it materially reduces the inside diameter of the pipe and readily permits of the pipe being obstructed if it is not reamed out. Different devices have been designed for doing this in connection with a stock and die for threading pipe but none of them to date have been commercially successful. Practically all of them work on the principle of removing the burr while the threads are being cut on the pipe. This is quite impractical because it takes most of a man's strength to operate the die-stock while cutting the threads and the added work of reaming the burr at this time, in addition to making the work entirely too hard puts a large unnecessary strain on the die-stock. This is particularly true of pipe threads where the thread is tapered and the deepest thread is cut in the beginning, as it is at the time of cutting this deep thread that the burr would be removed by a device that works simultaneously with the threading of the pipe.

Most of the reaming attachments heretofore designed have the further disadvantage of being bolted to the stock. The stock is a fairly heavy strong piece of mechanism and when such a device is permanently secured to it there is no doubt but that, in the rough handling which the stock receives, the device would soon be broken or bent out of shape. There are also times when one may not wish to use the reamer and the device would be very much in the way on such occasions.

When the cutting edge of the reamer is brought against the burr it is imperative that it be held there as a heavy burr, such as would be formed by a dull pipe cutter, takes a substantial amount of energy to remove it. The devices heretofore designed depend entirely upon a set screw acting upon the member carrying the cutter or upon a threaded stem carried by the cutter and secured in a slot by a nut. These constructions are entirely inadequate as the cutter would be forced away from the burr instead of reaming it.

Applicant has provided an exceedingly simple structure to overcome all of the foregoing objections. A substantial rugged member is provided which may instantly be engaged with or disengaged from the stock. This member carries a strong stud to which the cutter is fixed. This stud is free to slide in the member and after the thread has been cut the cutter is brought up to the inside of the pipe and positively held there, so that when the die-stock is removed or backed off the burr or any other roughness in the pipe is cleanly reamed out. The attachment may be on the stock while the thread is being cut or it may be placed in position after the thread is cut and before the die-stock is backed off.

Other advantages will become apparent as the description proceeds and the various novel features of construction and arrangement of parts will be more fully described and set forth with particularity in the claims appended hereto.

Referring to the accompanying drawings which illustrate one embodiment of the invention:

Figure 1 is a front elevation of a stock and die showing the reaming attachment in position thereon;

Figure 2 is a central longitudinal section of the stock and die with the reaming attachment shown in side elevation;

Figure 3:
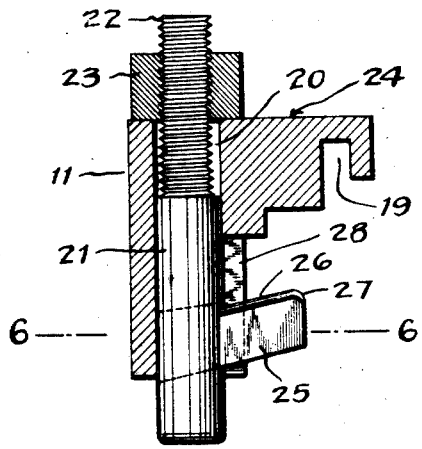
Figure 3 is a central longitudinal section of the reaming attachment.
Figure 4:
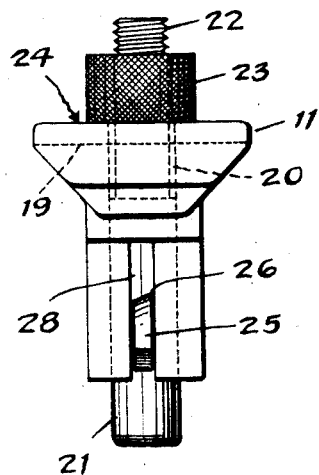
Figure 4 is an elevation of the reaming attachment looking toward the left of Figure 3.
Figure 5:
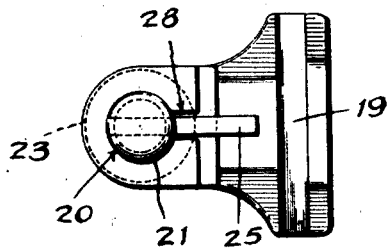
Figure 5 is a bottom plan view.
Figure 6:
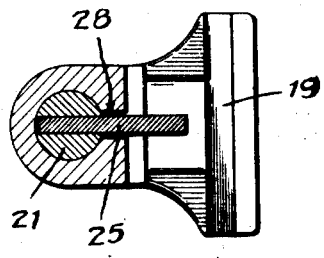
Figure 6 is a cross sectional view taken on line 6—6 of Figure 3.

The reference numeral 10 indicates a stock and die of a well known type used at the present time for cutting pipe threads. The reaming attachment 11 is shown in conjunction with this stock and die. While this type of stock and die is most commonly used and is illustrated with the attachment thereon in the drawings it is desired to call attention to the fact that the attachment with slight modifications may be readily adapted for use on other forms of die-stocks.

The die-stock illustrated comprises a pipe holder 12 which is secured to the pipe 13 and forms a guide for the die head 14 which has the squared flange 15 on its outer end. This flange 15 carries the die holders 16 and has the long operating handles 17 (the same being broken off in the drawings for economy of space) attached thereto. The flange 15 is connected by sliding tapered pins to a taper pin plate or ring 18 which is free to rotate in the pipe holder. The details of this die-stock are so well known that further explanation is not thought necessary.

The reaming attachment 11 comprises a substantially L-shaped member which has a groove 19 in its short leg. This groove 19 cooperates with the flange 15 of the stock and forms the means whereby the reaming attachment may be readily placed in engagement with or disengaged from the stock. As shown the part of the short leg with the groove 19 therein is widened out so as to give a substantial bearing on the flange 15. The attachment may be placed on the stock between any two of the die holders 16 and due to the fact that the flange 15 is squared and the part of the L-shaped member with the groove therein approximately fills the space on the flange 15 between the die holders there is no probability of the L-shaped member turning in relation to the stock after it has been mounted on the stock. It might be desirable to provide a set screw for holding the reaming attachment on the flange 15 or the L-shaped member might be integral with the flange 15 but the construction illustrated is preferred.

The long arm of the L-shaped member has a central bore 20 in which the stud 21 is slidably mounted. The stud 21 is threaded at 22 and has the knurled nut 23 in engagement with said threads. This nut normally rests on the face 24 of the L-shaped member.

An inclined cutter 25 is secured to the stud 21 adjacent the opposite end from the threaded portion 22. This cutter may be secured to the stud in any convenient manner. As illustrated it is driven into the stud and held there frictionally but it might be held in place by a headless set screw or other means. It is preferred to have this cutter removably mounted in the stud so that it may be renewed at any time or taken out of the stud for resharpening. The cutter is inclined upwardly from a right angle in relation to the central axis of the stud and its upper face is beveled off to form the cutting edge 26. The outer extremity 27 of the cutting edge is rounded off as illustrated in Figs. 2 and 3. This is quite important as it has been found out by experimenting that a cutter without the rounded corner 27 will break off when reaming the pipe and will not do the required work.

A slot 28 is formed in the long arm of the L-shaped member. This slot 28 allows the cutter to be moved at will for different diameters of pipe and the walls of the slot maintain the cutter in its proper position and prevent it from turning in relation to the stud upon which it is mounted.

It will be noted that the L-shaped member and the stud are of a heavy strong and rugged construction, thus enabling them to stand great strain and hard usage which they will always be called upon for in this line of work. As shown in Fig. 2 when the rounded end of the cutter has been brought up to the inside of the pipe, preparatory to backing the stock and die off the pipe and removing the burr, it is positively held in that position by the large knurled nut abutting against the outer face of the L-shaped member. This absolutely prevents any possibility of the cutter moving longitudinally or away from the burr. The stud being of a large diameter and the L-shaped member being very rugged and strong insure the parts functioning properly and the burr, regardless of how heavy it may be, will be removed without any chance of the cutter slipping.

The operation of the reaming attachment is as follows: Prior to threading the pipe the reaming attachment may be slipped into position on the flange 15. While the threads are being cut the nut 23 is loosened so that the cutter 25 is not in engagement with the internal wall of the pipe. After the threads have been cut the required depth on the pipe the nut 23 is turned until the rounded corner 27 of the cutter barely or not quite touches the inside of the pipe. This position is shown in Fig. 2. The die-stock is then backed off the pipe. The sloped cutting edge 26 of the inclined cutter will then gradually attack the burr 29 on the end of the pipe and by the time the dies on the stock have come to the end of the threads and the stock is to be removed the burr will be neatly cleaned out. It is obvious that if it were desired to thread the pipe without the attachment on the stock this could just as readily be done and before backing the stock off the reaming attachment could be instantly slipped into place and the operation would be the same.

It will be obvious that one skilled in the art might make changes, in details and form, from the preferred embodiment of the invention illustrated and described, and such changes are within the range of the invention and are contemplated as coming within the scope of the appended claim.

What we claim as new and desire to secure by Letters Patent is:

In a device of the character described, the combination with a stock and die for threading a pipe, of a reamer for reaming the pipe, said reamer comprising an angle shaped member, one leg thereof having means for cooperating with the stock whereby said member may be readily engaged with or disengaged from the stock, and the other leg of said member carrying a stud freely and slidably mounted therein, a cutter carried by the stud and projecting through a slot in said leg so as to prevent said cutter from turning in relation to the axis of said stud and an adjusting nut threaded on the end of the stud, the adjusting nut butting up against the face of said angle shaped member so as to maintain said cutter in contact with the inside of the pipe being reamed.

In testimony whereof we affix our signatures.

ROBERT P. TOLEN.
JOHN J. CARPENTER.